United States Patent [19]

Tebbe

[11] Patent Number: 5,185,543
[45] Date of Patent: Feb. 9, 1993

[54] MOTOR VEHICLE DRIVE LINE TORSIONAL VIBRATION DAMPER

[75] Inventor: Gerhard Tebbe, Geldersheim, Fed. Rep. of Germany

[73] Assignee: Fichtel & Sachs Ag, Schweinfurt, Fed. Rep. of Germany

[21] Appl. No.: 882,759

[22] Filed: May 11, 1992

Related U.S. Application Data

[63] Continuation of Ser. No. 657,104, Feb. 15, 1991, abandoned.

[30] Foreign Application Priority Data

Feb. 27, 1990 [DE] Fed. Rep. of Germany ....... 4006075
Jan. 15, 1991 [DE] Fed. Rep. of Germany ....... 4100937

[51] Int. Cl.$^5$ .................. H02K 5/24; H02K 49/00; F16F 15/10; F02B 75/06
[52] U.S. Cl. ........................... 310/51; 310/92; 74/574; 123/192.1
[58] Field of Search ........... 310/51, 92, 93, 95, 310/77, 100; 192/65; 74/574; 123/192.1

[56] References Cited

U.S. PATENT DOCUMENTS

| | | | |
|---|---|---|---|
| 1,961,679 | 6/1934 | Wälti | 464/180 |
| 3,548,986 | 12/1970 | Fisher | 192/88 A |
| 3,837,239 | 9/1974 | Bodine | 74/843 |
| 4,061,216 | 12/1977 | Sullivan et al. | 192/46 |
| 4,326,158 | 5/1982 | Helgesen | 322/4 |
| 4,493,408 | 1/1985 | Nagano | 192/106.2 |
| 4,531,605 | 7/1985 | Sholz et al. | 180/165 |
| 4,563,165 | 1/1986 | Takeuchi | 464/64 |
| 4,687,087 | 8/1987 | Tebbe | 192/106.2 |
| 4,809,830 | 3/1989 | Schierling et al. | 192/3.29 |
| 4,820,239 | 4/1989 | Despres et al. | 464/68 |
| 4,864,173 | 9/1989 | Even | 310/93 |
| 4,922,869 | 5/1990 | Kadomokai et al. | 123/192 R |

FOREIGN PATENT DOCUMENTS

| | | |
|---|---|---|
| 1126978 | 4/1962 | Fed. Rep. of Germany . |
| 3005561 | 8/1980 | Fed. Rep. of Germany . |
| 3126149 | 4/1982 | Fed. Rep. of Germany . |
| 3230607 | 2/1984 | Fed. Rep. of Germany . |
| 3404738 | 8/1985 | Fed. Rep. of Germany . |
| 3607648 | 9/1986 | Fed. Rep. of Germany . |
| 0006819 | 4/1986 | Japan ............... 123/192 B |

OTHER PUBLICATIONS

German Document, "Dynamische Untersuchungen des Antriebastrangs von Kraftfahrzeugen", 1981, pp. 325 and 327.
"Optimierugn der Komforteigenschaften des Triebstrangs von Mercedes-Benz Fahrzeugen mit Schaltgetriebe" by Hans-Joachim Schöpf et al., pp. 568–575, 1989.
"Dynamische Untersuchungen des Antriebsstranges von Kraftfahrzeugen" by H. Peeken et al., pp. 324–328, 1981.
"Torsionsschwingungsuntersuchungen bei Nutzfahrzeugen" by Eugen Lauster et al., pp. 359–365, 1978.
"Hütte des Ingenieurs Taschenbuch" by Verlag von Wilhelm Ernst & Sohn pp. 272 & 273, 1957.

Primary Examiner—Emanuel Voeltz
Assistant Examiner—D. R. Haszko
Attorney, Agent, or Firm—Anderson Kill Olick & Oshinsky

[57] ABSTRACT

For damping torsion vibrations in the drive line of a motor vehicle which contains a torsion vibration damper (5) between its internal combustion engine (1) and its gearbox (11), there is coupled to the output of the torsion vibration damper (5) an electric motor driven torque buffer (23) which compensates for any fluctuations in torque still present at the output of the torsion vibration damper (5) and occasioned by the firing sequence of the internal combustion engine (1). The torque buffer (23) is constructed after the fashion of a polyphase synchronous motor, the number of pairs of poles and possibly the rotary speed at which the magnetic fields rotates being so chosen that the angular cycle of the torque fluctuation exerted by the magnetic field on the rotor (31) of the torque buffer is equal to the angular cycle of the torque fluctuation originating from the firing sequence of the internal combustion engine (1). A control circuit (37) regulates the phasing of the magnetic field and its intensity.

13 Claims, 2 Drawing Sheets

MOTOR VEHICLE DRIVE LINE TORSIONAL VIBRATION DAMPER

This is a continuation application of Ser. No. 07/657,104, filed Feb. 15, 1991, abandoned.

BACKGROUND OF THE INVENTION

The invention relates to an apparatus for damping torsional vibrations in a motor vehicle drive line comprising a gearbox and transmitting the driving torque of an internal combustion engine.

Known from DE-A-34 04 738 is a friction clutch disposed in the drive line of a motor vehicle between its internal combustion engine and its gearbox and of which the clutch plate comprises a torsion vibration damper. The torsion vibration damper has an input part which carries the clutch friction linings of the clutch plate and which is therefore driven by the internal combustion engine and, rotatable relative to the input part and seated on the input shaft of the gearbox an output part which is coupled in a torsionally resilient manner via a plurality of springs. The torsion vibration damper diminishes irregularities in the transmission of torque in the drive line such as occur particularly during a crankshaft rotation by virtue of successive firings of the internal combustion engine. However, there are often instances where the irregularity of rotation can only be unacceptably compensated by means of the prior art torsion vibration damper. Where the prior art friction coupling is concerned, therefore, an additional mass is provided which is rotatable in relation to the output part of the torsion vibration damper and which can be coupled to the output part of the torsion vibration damper when desired in order to suppress gearbox rattle. The resultant improvement in vibration damping is however likewise insufficient for many applications.

It is known from DE-A 32 30 607 to utilize the dynamo which is driven by the internal combustion engine in order to reduce irregularities in the driving torque. By means of a control circuit which responds to the time-related variation in the angular speed of the crankshaft, the energizing current of the dynamo is so influenced that the load moment which the dynamo opposes to the driving torque of the internal combustion engine seeks to compensate for fluctuations in the driving torque. The rotor of the dynamo in the prior art apparatus is at the same time used as a flywheel for the internal combustion engine. In order to be able to compensate for irregularities in crankshaft rotation, the prior art apparatus requires a comparatively rapid control circuit. The vibration-damping effect is nevertheless inadequate for many applications since the excitation of the dynamo cannot be varied at will if its generator function is not to be adversely affected.

Thus it is an object of the invention to indicate a way whereby torsion vibrations occasioned in the drive line of a motor vehicle due to the non-uniformity of the internal combustion engine can be damped more satisfactorily than hitherto.

SUMMARY OF THE INVENTION

The invention is based on a conventional torsion vibration damper disposed in the motor vehicle drive line between its internal combustion engine and its gearbox, such as is provided for example in conventional clutch plates of friction clutches. Such a torsion vibration damper comprises as usual an input part which is rotatingly driven by the internal combustion engine and an output part which is torsionally resiliently connected to the input part via spring elements, for example coil thrust springs or the like, said output part possibly being seated on the input shaft of the gearbox. According to the invention there is coupled to the output part an electric motor driven torque buffer which is so regulated via a control circuit that torque fluctuations occurring at the output part of the torsion vibration damper are fully compensated, being however at least sufficiently damped. Since the electrically driven torque buffer is downstream of the drive line, the torque buffer only has to be dimensioned for a relatively small alternating torque compared with the alternating torque occurring at the input part of the torsion vibration damper due to the unevenness of the internal combustion engine.

The electric motor driven torque buffer according to the invention, similar to an electric motor and in particular similar to an alternating current synchronous motor, comprises a stator, a rotor which is rotationally rigidly connected to the output part of the torsion vibration damper, and energized by a control circuit, a winding arrangement which generates a magnetic field which varies in a peripheral direction according to a predetermined number of pairs of poles and which is either stationary or rotates at a speed proportional to the engine speed, for generating a periodically fluctuating torque acting on the rotor. The number of pairs of poles and possibly the proportionality factor of the rotary speed of the magnetic field are so chosen that the torque exerted on the rotor by the magnetic field relative to one revolution of the rotor fluctuates periodically, the angle of rotation cycle being equal to that at which the fluctuations in driving torque occasioned by firing of the engine and relative to the revolution of the rotor follow one another. In this way, the angular symmetry with which the firing process and the torque irregularities occasioned by the firing processes and relative to the crankshaft occur is transmitted to the rotor coupled to the crankshaft via the torsion vibration damper. For compensation of the irregularities or unevenness, therefore, it is sufficient for the control circuit to regulate the phasing and/or amplitude of the periodic torque fluctuations exerted on the rotor by the magnetic field in relation to the torque fluctuations occasioned by the firing process. The periodicity of the magnetic field is already taken into account by the construction of the rotor or stator and possibly by the choice of the constant proportionality factor of the speed of rotation of the magnetic field. A control circuit of this type may have comparatively slow control properties.

For a particularly even compensation of irregularities in the driving torque, the electric motor driven torque buffer expediently generates a torque of periodically changing direction.

In order to be able to alter the angular position relative to the crankshaft of the magnetic field generated by the winding arrangement, the winding arrangement expediently has a plurality of peripherally offset winding strands, the control circuit regulating the phasing and/or amplitude of the currents fed to the individual winding strands. A comparatively simple construction of torque buffer is achieved if the winding arrangement is provided on the stator and if the rotor has magnetic poles which may be either permanent magnetic poles or also magnetic poles which are externally energizing by a rotor winding. Slip rings or the like are avoided in the latter version if the rotor carries a generator winding to which the rotor winding is connected via a rectifier. The generator winding rotating in the magnetic field of the stator in this case generates the energizing current of the rotor winding.

Adaptation of the fluctuation cycle at which the torque of the torque buffer fluctuates to the fluctuation cycle of the unevenness of the drive torque is governed by the number of ignitions of the internal combustion engine per revolution of its crankshaft and thus by the number of ignitions per revolution of the rotor. It is possible to manage with a stationary magnetic field if the number of pairs of poles is chosen to be equal to the number of ignitions per revolution. In the case of an internal combustion engine which is constructed as a four-stroke engine which has an even number of cylinders, the number of pairs of poles is chosen to equal half the number of cylinders. In the case of an uneven number of ignitions per revolution of the crankshaft, as may be the case for example with four-stroke engines having an odd number of cylinders, the number of ignitions can be adapted to the number of pairs of poles if the number of pairs of poles is chosen to be equal to the number of cylinders and the winding arrangement is so controlled that it generates a magnetic field which rotates in the same direction as the rotor at half the speed of the internal combustion engine. It will be understood that also other proportionality factors and also rotary fields rotating in the opposite direction to the rotor may be used if required. Compared with a stationary magnetic field, the non-uniformity of an ignition frequency which is doubled for example by doubling the number of cylinders can be compensated for if the magnetic field rotates in opposition to the rotor and at the engine speed.

In order to be able to change gears more easily in spite of the torque buffer which is coupled to the input shaft of the gearbox, it is expediently envisaged that the rotor be connected to the input shaft of the gearbox via a clutch which can be controlled as a function of the gear-changing process, so that during the gear changing process the rotor can be disengaged from the input shaft. In a preferred development, it is envisaged that the rotor be axially offset in relation to the stator and guided for axial movement in relation to the stator so that the magnetic field of the winding arrangement generates an axial force which, when the winding arrangement is energized it attracts the rotor towards a clutch seat which is connected to the input shaft of the gearbox. During the process of changing gears, energizing of the winding arrangement is interrupted, so that the rotor is lifted off the clutch seat possibly under the force of a pretensioning spring. The clutch seat is preferably a cone fixed on the input shaft of the gearbox and onto which the rotor runs with a frictional fit when the winding arrangement is energized.

The various features of novelty which characterize the invention are pointed out with particularity in the claims annexed to and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
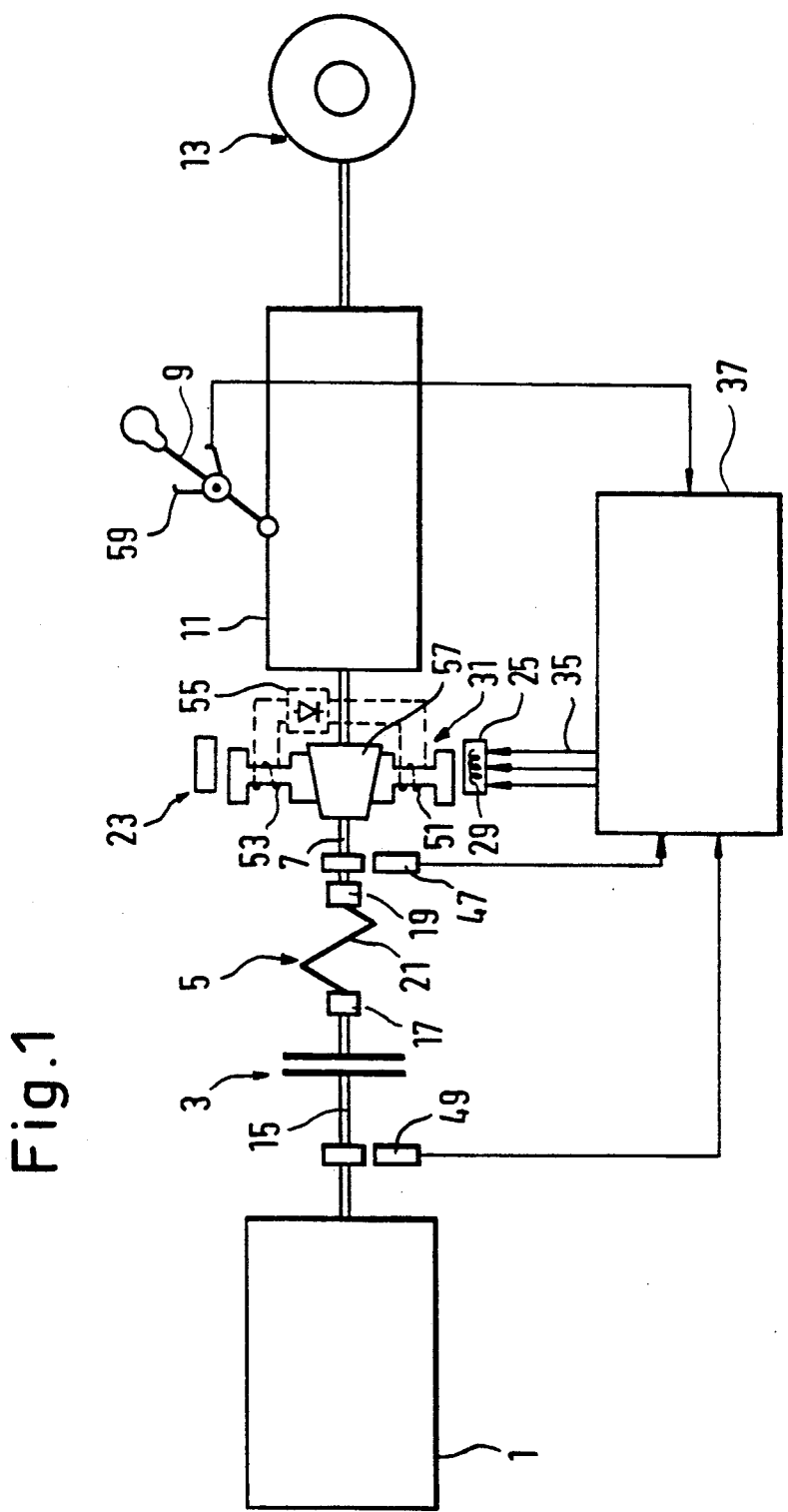
FIG. 1 is a diagrammatic view of the drive line of a motor vehicle with an electric motor driven torque buffer.

FIG. 1 shows a motor vehicle drive line extending from an internal combustion engine 1 via a start-up and change-speed clutch 3, a torsion vibration damper 5 which follows the clutch 3 in the torque path, to the input shaft 7 of a gearbox 11 which in the example illustrated can be operated manually by means of a shift lever 9. The gearbox 11 drives the wheels of the motor vehicle through a conventional axle drive 13. The torsion vibration damper 5 which may be integrated for instance into a clutch plate, not shown in greater detail, of the clutch 3, comprises an input part shown diagrammatically at 17 and rotatingly driven by the crankshaft 15 of the internal combustion engine and, equiaxial therewith and seated rotationally rigidly on the input shaft 7 of the gearbox 11, an output part 19 which is torsionally resiliently coupled to the input part 17 through a spring arrangement 21 consisting for example of a plurality of spring elements. The torsion vibration damper 5 transmits the average torque delivered to the crankshaft 15 by the internal combustion engine 1 but reduces torque fluctuations occasioned by the firing sequence of the internal combustion engine 1 and superimposed on the mean torque.

Figure 2:
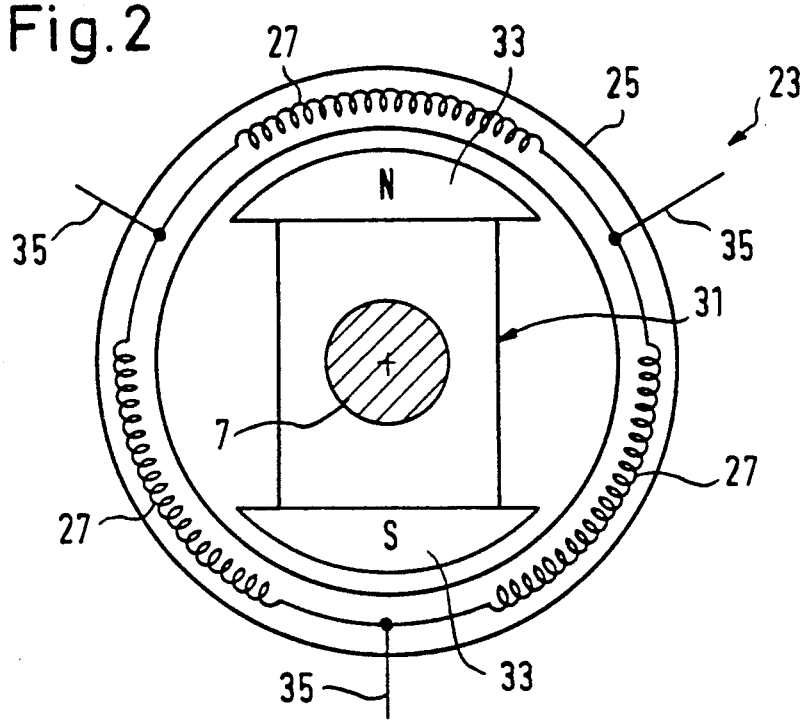
FIG. 2 illustrates the principle of an embodiment of torque buffer.
Figure 3:
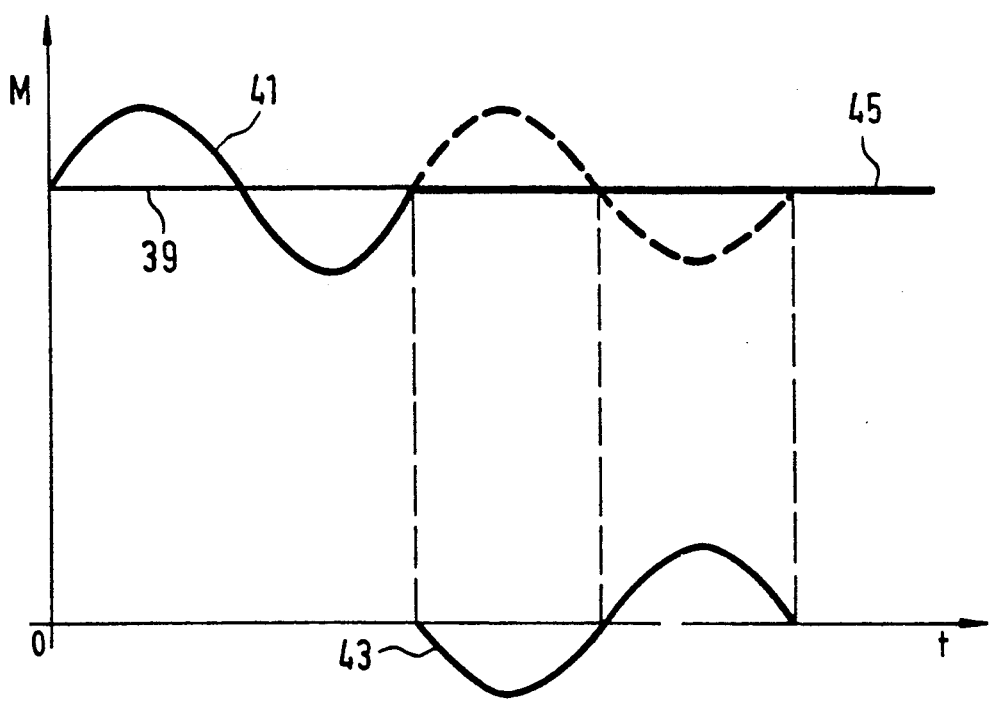
FIG. 3 is a diagram which shows as a function of the time t the torques M which occur in the drive line.

In the torque path between the torsion vibration damper 5 and the gearbox 11 there is connected to the input shaft 7 an electric motor driven torque buffer 23 which compensates for any irregularity in the driving torque which is still present at the output from the torsion vibration damper 5 and which is attributable to the firing sequence. The torque buffer 23 comprises, rather like a polyphase current synchronous motor, a stator 25 with a winding arrangement 29 subdivided into a plurality of winding strands 27 (FIG. 2) distributed over the periphery of the stator 25, and a rotor 31 coupled to the input shaft 7 and with a number of magnetic poles 33, the number of pairs of poles being chosen in accordance with criteria which are explained hereinafter. The winding strands 27 are connected to one another either in a star connection or, as shown in FIG. 2, in a delta connection and are connected by connecting lines 35 to a control circuit 37 which controls the angular position of the magnetic field generated by the winding arrangement 29 in relation to the stator and the strength of the magnetic field. The magnetic field exerts on the magnetic poles 33 which are rotating with the input shaft 7 a changing and in particular a periodically alternatingly accelerating and braking torque which compensates for non-uniformity or fluctuation in the driving torque occasioned by the firing sequence of the internal combustion engine 1. FIG. 3 shows at 39 the mean value of the driving torque on which a torque fluctuation 41 is superimposed at the output from the torsion vibration damper 5. The torsion buffer 23 superimposes on the driving torque an equally great but oppositely directed torque fluctuation 43 which compensates for the torque fluctuation 41 occasioned by the firing sequence, as shown at 45. The amplitude of the torque fluctuation 43 and its phasing in relation to the torque fluctuation 41 is regulated by the control circuit 37 which to this end responds in magnitude and phasing and by means of a sensor 47 to the torque fluctuation of the input shaft 7 of the gearbox 11. In order to be able to act more quickly to variations in rotary speed fluctuations of the crankshaft 15, the control circuit 37 additionally responds also to rotary speed fluctuations of the crankshaft 15, through a sensor 49.

The control circuit regulates only the strength of the magnetic field which accelerates or brakes the rotor 31 and the phase position of the magnetic field in relation to the torque fluctuation of the driving torque occasioned by the firing sequence. The fluctuation cycle of the magnetic field exerted on the rotor 31 on the other hand is determined by a suitable choice of the number of pairs of poles and possibly the direction of rotation and the rotary speed of the magnetic field. These parameters are so chosen that the torque exerted on the rotor 31 by the magnetic field, in relation to one revolution of the rotor 31, fluctuates periodically with an angle-of-rotation cycle which is equal to the angle-of-rotation cycle with which the fluctuations in driving caused by the ignitions of the internal combustion engine follow one another, in relation to one revolution of the rotor. This angle of rotation cycle depends both on the type of the internal combustion engine concerned and also upon the number of cylinders. Whereas in the case of a four-stroke engine ignition in every cylinder takes place only during every second revolution of the crankshaft, in the case of a two-stroke engine, there is ignition during each rotation. The number of pairs of poles determines the number of fluctuation cycles occurring per revolution and upon passage through the magnetic field and of these fluctuation cycles, each consists of one accelerating and one braking half-wave.

FIG. 2 shows the example of a torque buffer with three strand windings which are angularly offset by 120° in respect of one another. The rotor 31 has permanent magnet poles 33 and a number of pairs of poles equal to 1. If the strand windings 27 are energized with three-phase current, the magnetic field generated thereby rotates at the same frequency as the alternating current. By "freezing" the currents in a phase position of the polyphase current at any given moment, a stationary field can be generated with an angular position relative to the stator 25 which is determined by the phase position.

If a stationary magnetic field and a rotor with one pair of poles are used, then in accordance with the principles explained hereinabove, the fluctuations in driving torque occasioned by the firing sequence in a two cylinder four-stroke engine or a single cylinder two-stroke engine are self-compensating. To compensate for the irregularity of a single cylinder four-stroke engine, the magnetic field in the arrangement shown in FIG. 2 must rotate in the same direction as the rotor but at half the engine speed. If the magnetic field in the arrangement in FIG. 2 rotates at the same speed as the engine but against the direction of rotation of the rotor, then irregularities in a four cylinder four-stroke engine or a two cylinder two-stroke engine become self-compensating.

The choice of larger numbers of pairs of poles makes it possible to compensate for irregularities in internal combustion engines having a greater number of cylinders. For a four cylinder four-stroke engine, then, a stationary magnetic field can be used. Irregularities in a five cylinder four-stroke engine can be compensated for when using a rotor with five pairs of poles if the magnetic field of the stator rotates at half the engine speed and in the same direction as the rotor.

In the example of embodiment shown in FIG. 2, the poles 33 of the rotor 31 are constructed as permanently magnetic poles. In order to enhance excitation, the poles of the rotor can however also be provided with externally energized rotor windings. In order to save on slip rings or the like for the external excitation of the rotor winding, it is possible as shown in FIG. 1 for the rotor 31 to be provided not only with the rotor winding 51 but with a generator winding 53 to which the rotor winding 51 is connected via a rectifier 55. The energizing current generated by the generator winding 53 upon rotation of the rotor 31 feeds the rotor winding 51.

The gyrating mass of the rotor 31 which is connected to the input shaft 7 of the gearbox 11 can in unfavorable cases impair the speed changing facility of the gearbox 11. To prevent this, the rotor 31 is uncoupled from the input shaft while the gears are being changed in the gearbox 11. The rotor 31 is fitted onto a clutch cone 57 mounted on the input shaft 7 and is adapted for axial movement so that it can be moved between a position in which it is lifted off the clutch cone 57 and a position in which it is frictionally seated on the clutch cone 57. In the disengaged position, the rotor 31 is axially offset in relation to the stator 25 so that upon excitation of the winding arrangement 29 of the stator 25, it is drawn into the stator 25 and towards the clutch cone 57. Associated with the shift lever 9 is a sensor 59 which responds to actuation of the shift lever 9 and interrupts excitation of the winding arrangement 29 of the stator 25 during the gear changing operation. Therefore, the rotor 31 is disengaged from the gearbox input shaft during the gear changing process.

While specific embodiments of the invention have been shown and described in detail to illustrate the application of the inventive principles, it will be understood that the invention may be embodied otherwise without departing from such principles.

What I claim is:

1. An apparatus arranged in a drive line of a motor vehicle for damping torsion vibrations in the drive line, and for transmitting a driving torque of an internal combustion engine, said apparatus, comprising:

a gear box; arranged in the drive line:

a torsion vibration damper with an input part rotatingly driven by the internal combustion engine;

an output part of the torsion vibration damper connected to the gearbox for the rotating drive of the gearbox and connected to the input part in torsionally resilient manner via spring elements;

a control circuit;

an electric motor drive torque buffer located in the drive line between the output part of the torsion vibration damper and said gearbox and connected directly to said gearbox; comprising:

a stator;

a rotor rotationally rigidly connected to an output part of the torsion vibration damper;

control circuit energizing said rotor;

a winding generating a magnetic field which varies in a peripheral direction according to a predetermined number of pairs of poles and is one of stationary and rotatable at a speed proportional to the engine speed, for generating a periodically fluctuating torque acting on the rotor, wherein at least one of the number of pairs of poles and the proportionality factor of the rotary speed of the magnetic field being so chosen that the torque exerted on the rotor by the magnetic field relative to one revolution of the rotor fluctuates periodically, and wherein an angle-of-rotation cycle being equal to that at which the fluctuations in driving torque occasioned by firing of the engine and relative to the revolution of the rotor follow one another, and wherein the control circuit so regulating at least one of phasing and amplitude of the periodic torque fluctuations exerted on the rotor by the magnetic field in relation to the torque fluctuations occasioned by the firing process that the torque fluctuations are at least approximately self-compensating.

2. The apparatus of claim 1, wherein the electric motor driven torque buffer generates a torque of periodically changing direction.

3. The apparatus of claim 1, wherein the winding arrangement has a plurality of winding strands which are offset in respect of one another in a peripheral direction and wherein the control circuit regulates at least one of the phasing and the amplitude of the currents fed to the individual winding strands.

4. The apparatus of claim 3, wherein the winding arrangement is provided on the stator and the rotor has magnetic poles (33).

5. The apparatus of claim 4, wherein the rotor has permanent magnetic poles.

6. The apparatus of claim 4, wherein the rotor has magnetic poles which are externally energized by a rotor winding.

7. The apparatus of claim 6, wherein the rotor (31) carries a generator winding (53) to which the rotor winding (51) is connected via a rectifier (55).

8. The apparatus of claim 1, wherein the number of pairs of poles is equal to the number of ignitions of the internal combustion engine per revolution of the rotor and the winding arrangement generates a magnetic field stationary relative to a stator of said torque buffer.

9. Apparatus according to claim 8, wherein the internal combustion engine is constructed as a four-stroke engine with an even number of cylinders and the number of pairs of poles is chosen to be equal to half the number of cylinders.

10. The apparatus of claim 1, wherein the internal combustion engine is constructed as a four-stroke engine with an odd number of cylinders, the number of pairs of poles is equal to the number of cylinders and the winding arrangement generates a magnetic field which rotates in the same direction as the rotor but at half the rotary speed of the internal combustion engine (1).

11. The apparatus of claim 1, wherein the gearbox is constructed as a change-speed gearbox and the rotor being rotationally rigidly connected to an input shaft of the gearbox via a clutch which is controlled as a function of the gear-changing process.

12. The apparatus of claim 11, wherein the rotor is axially offset in respect of the stator and is guided for axial movement relative to the stator so that the magnetic field of the winding arrangement generates an axial force which, when the winding arrangement is energized, attracts the rotor towards a clutch seat connected to the input shaft of the gearbox and wherein the excitation of the winding arrangement is discontinued during the gear 5 changing process within the gearbox.

13. The apparatus of claim 12, wherein the clutch seat is constructed as a cone fixed on the input shaft of the gearbox.

* * * * *